July 31, 1962 — O. A. VICIK ET AL — 3,046,784
DEPTH AND PRESSURE GAUGE
Filed June 8, 1959 — 3 Sheets-Sheet 1

INVENTORS
OTTO A. VICIK
JOSEPH S. SEROCKI
BY
ATTORNEY

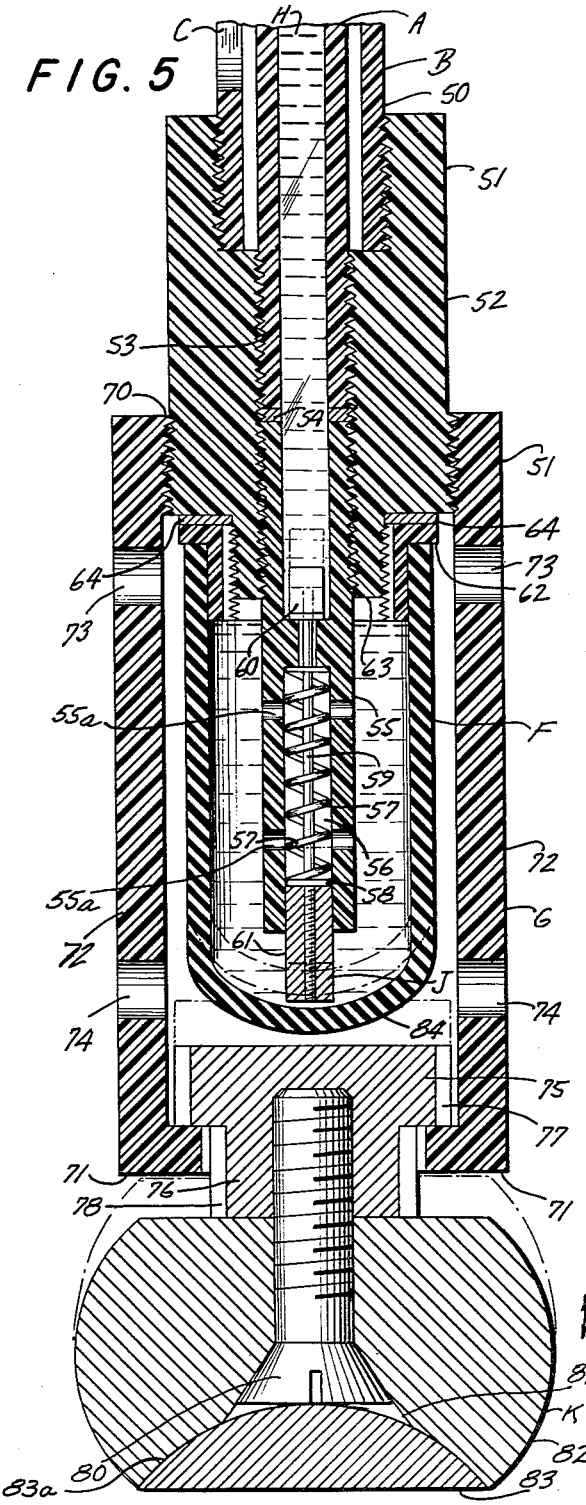
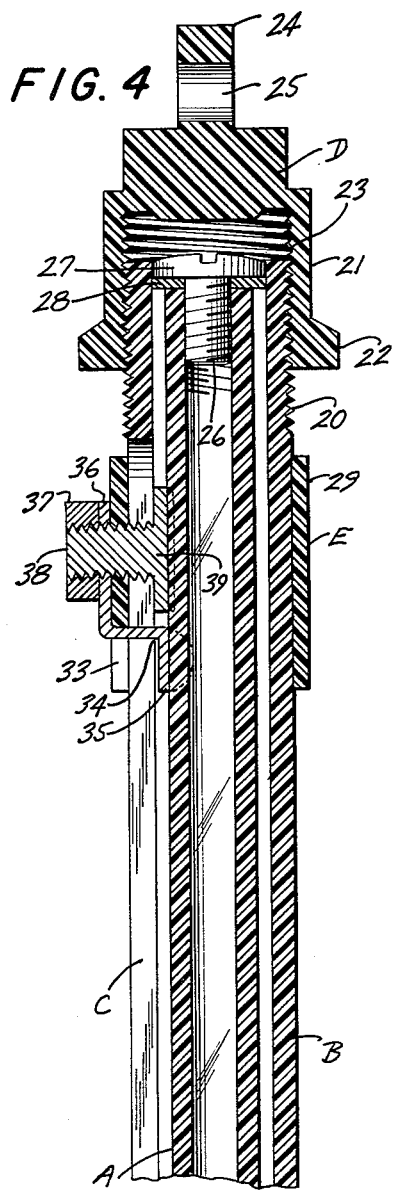

July 31, 1962　　　O. A. VICIK ET AL　　　3,046,784
DEPTH AND PRESSURE GAUGE
Filed June 8, 1959　　　3 Sheets-Sheet 3
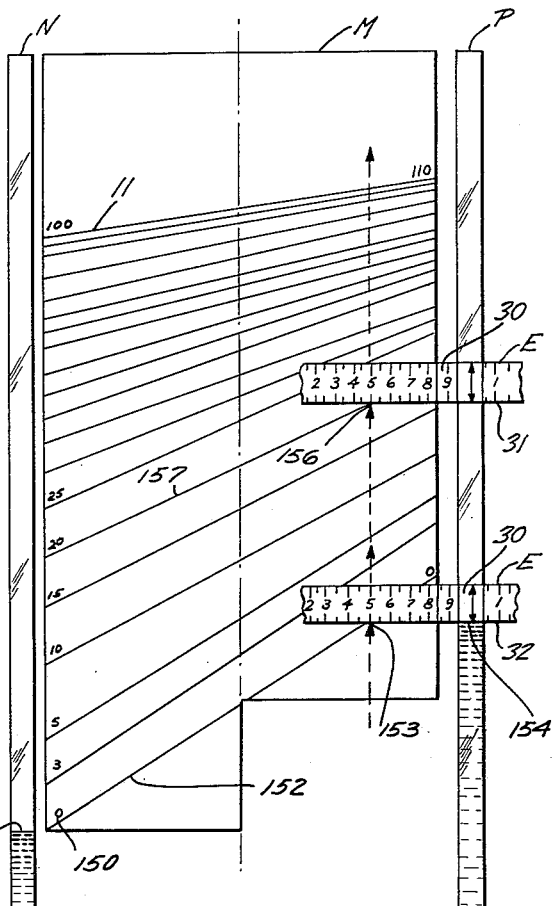
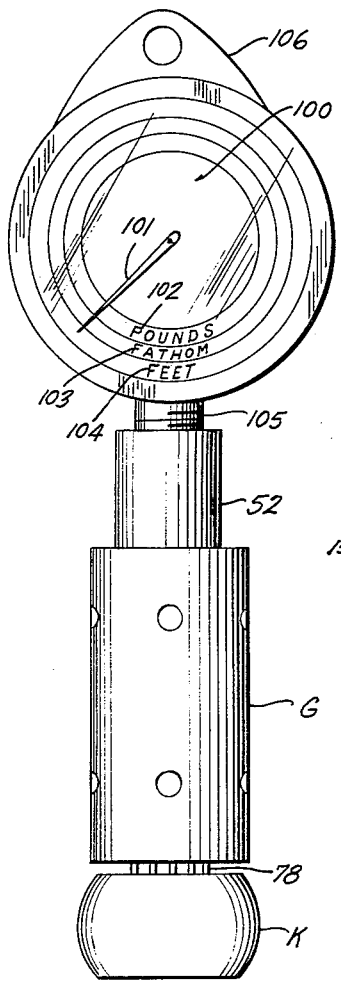
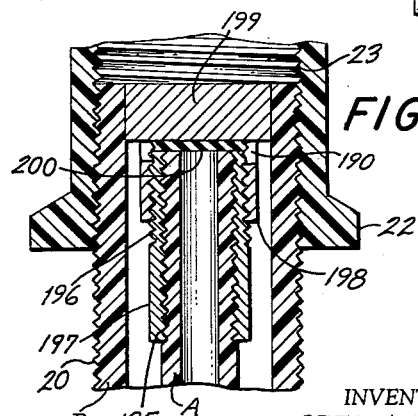
INVENTORS
OTTO A. VICIK
JOSEPH S. SEROCKI
BY
ATTORNEY

United States Patent Office 3,046,784
Patented July 31, 1962

3,046,784
DEPTH AND PRESSURE GAUGE
Otto A. Vicik, 4 Triangle Place, Tuckahoe, N.Y., and Joseph S. Serocki, 18—11 160th St., Whitestone, N.Y.
Filed June 8, 1959, Ser. No. 818,788
14 Claims. (Cl. 73—300)

The present invention relates to a depth and pressure gauge and it particularly relates to a device for taking soundings to determine depth and/or pressure and also to obtain a sample of the bottom and which, when drawn up, will enable an accurate determination of the depth and/or pressure and show a sample of the type of bottom sounded for any of a number of purposes.

It is among the objects of the present invention to provide a suitable depth and pressure gauge device which will readily and quickly determine the accurate depth of various portions of estuaries, rivers, streams, coastal and ocean waters, and which will permit operation by personnel without great skill or training and which will give an accurate determination of pressure and type of bottom at depth sounded.

Another object is to provide an inexpensive, simple and suitable depth and pressure gauge which may be reliably operated and which will not involve the continuous casting of lead weights and measuring of length of lines and which will be less susceptible to human error and error due to effects of poor visibility, rough waters, currents, and drift, as when a weight is thrown into moving waters which is dependent on the length of line for determination of depth.

Among the objects of the present invention is to provide a suitable depth and pressure gauge which will not be limited to the determining of depths and pressures of liquids sounded to area directly below personnel using device, but which will enable such personnel to accurately determine same at a substantial distance off, and the measurement of depth will not be dependent on measuring of the length of line.

A further object is to provide a depth and pressure gauge which will enable divers to record depth of dive, or depth and/or pressure at any stage of dive.

Another object of the invention is to provide a depth and pressure gauge which will reliably and accurately, with a suitable scale, determine depth of liquids and in turn capacities and pressures within liquid storage tanks and wells.

A further object is to provide a depth gauge which will enable personnel using same to quickly and easily, under various climatic conditions, without complicated charts or mathematical formulae, to eliminate the errors due to effects of barometric pressure, effect of temperature on air and/or liquid within device, effect on device by temperature of liquid sounded, effect on the ratio of volume occupied by air which contracted or expanded within device and the original volume within said device before being effected by temperature difference between atmosphere and liquid sounded, errors which in present date sounding devices are not corrected or compensated for.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects there is provided a simple elongated instrument having a measuring liquid column therein which, when being lowered, will be subjected directly to the pressure of the water.

Normally, the liquid column will be elevated as the instrument descends and will reach its greatest height when the bottom of the instrument strikes the bottom of the estuary, river, bay or other body of water.

However, upon striking the bottom, there is an actuation of a valving device which will cause the reading to be locked into position as soon as the instrument is drawn upwardly.

This reading then may be readily converted by graduations on the instrument, when it is raised to the top and inspected by the user, for the accurate determination of depth in feet or fathom, and/or pressure in pounds, at the position where the instrument has been dropped.

Desirably there may be provided a column containing a suitable colored non-freezing liquid which will be subjected to the pressure of the water through a diaphragm, with there being positioned above the liquid in the column a column of air or inert gas which will be compressible.

Normally, the liquid column will be elevated as the instrument descends and will reach its greatest height when the bottom of the instrument strikes the bottom of the estuary, river, bay or other body of water.

Then this elevated position of the liquid column is fixed after the instrument strikes the bottom and is elevated and it will be held in this position when the device is elevated to the surface, where the reading may be taken and the determination of the depth of water is made.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 4 is a fragmentary transverse longitudinal view upon an enlarged scale of the upper part of the device of FIG. 2.

FIG. 5 is an enlarged transverse sectional view of the lower part of the device of FIGS. 1 and 2.

FIG. 6 is a diagrammatic lay-out of the chart, as applied to the device which enables ready reading of the depth of the water from the position of liquid column in the instrument.

FIG. 7 is an alternative form of the instrument.

FIG. 8 is a transverse sectional view upon an enlarged scale as compared to FIGS. 1 to 3 of an alternative embodiment by which more air may be admitted to the top of the column A to establish atmospheric pressure in the column A.

Figure 1:
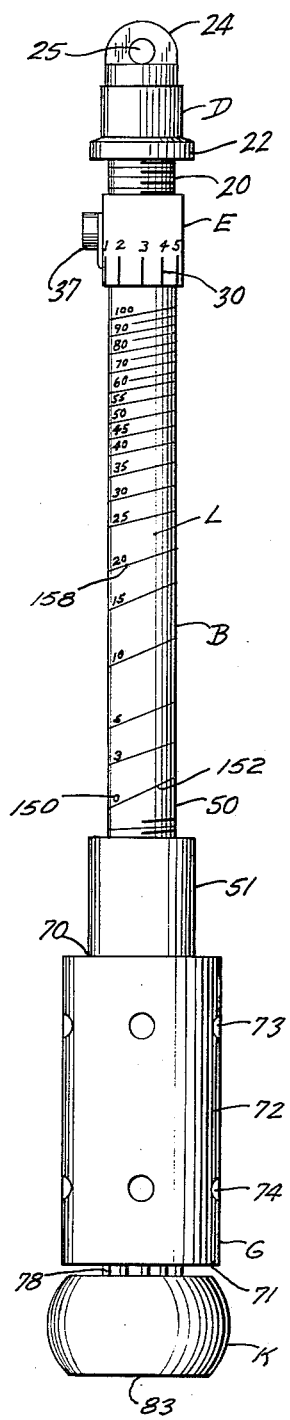
FIGURE 1 is a side elevational view of the device.

Referring to FIGS. 1 to 5, there is shown a transparent cylinder A of nylon or glass or other plastic enclosed in a protective non-corrosive metal or plastic tubular sheath B, preferably brass, having an elongated slot C to permit ready reading thereof.

The top of the column is closed by a head structure D while there is a scale selector E which may be moved upwardly and downwardly on the enclosure B.

At the lower portion of the instrument is the flexible member or baglike diaphragm F which is provided with a cylindrical enclosure G and which is filled with the same liquid H which is in the column and which enables a determination of the depth of the water. There is a valving arrangement J which cooperates with the reciprocating weight K to be certain that it is open when the bottom is reached.

In operation the instrument or weight of FIGS. 1 to 5 is dropped, and with strong spring tension the valve J is kept closed and the column of liquid H will be stationary until the bottom is reached.

When the weight K hits the bottom it will reciprocate against the bag F, necessitating the valve J to permit the water pressure partly to collapse the bag F, forcing the column H upwardly to a height which corresponds to the pressure at the bottom.

As soon as the instrument is lifted the weight K will drop, the valve J will seat and the column H will be locked in position so that the height of the column H of colored liquid will enable determination of the depth of water and/or pressure to the observer when the instrument is hauled out of the water into the boat or vessel and will also enable determination of the character of the bottom.

Referring more particularly to the drawings of FIGS. 1 to 4 the cap D will have an upwardly projecting vertical ear 24 with an opening 25 in which may be secured a line or wire (not shown) to the device which will enable casting, lowering or raising of the indicator when sounded.

The cap D has a depending skirt 23 which is interiorly threaded at 21, said skirt also being provided with an enlarged lower rim portion 22 by means of which it may be grasped and screwed onto or off of the upper threaded end 20 of the tubular member or protective housing B.

The upper end of the transparent tube A which may be of a plastic material not affected by salt water is sealed by means of the screw 26 having a slotted head 27 which compresses the gasket 28 against the top thereof.

Figure 3:
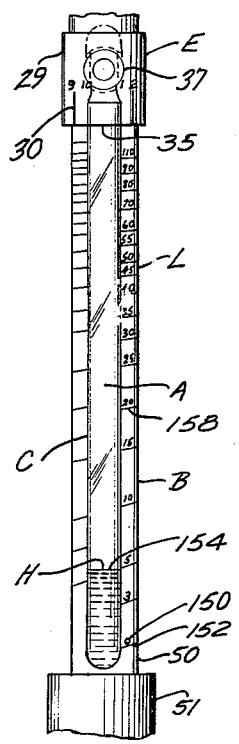
FIG. 3 is a fragmentary side elevational view taken from the line 3—3 of FIG. 2.

On the outside of the house or tubular enclosure B will be positioned the graduations L which are numbered as indicated at 150 in FIGS. 1, 3 and 6. The adjustable collar E has a sleeve 29 carrying vertical graduations 30 on the lower end thereof which graduations are also indicated diagrammatically at 30 to the right of FIG. 6.

This sleeve 29 is slotted, as indicated at 33, to receive the member 34 which has a lower clamp portion 35 fitting against the front of the tube A. (See FIG. 4.) The upper leg 36 receives the screw 37, which is screwed to the stem 38. The base 39 of the screw 38 presses against the glass or transparent tube A.

The nut 37 is for adjusting the tension or friction properly to permit the sleeve E to ride up or down in the slot 33.

Referring to the bottom structure best shown in FIG. 5, the lower portion 50 of the tubular enclosure B is threaded into the upper portion 51 of the collar 52. The collar 52 also has a threaded connection at 53 to the transparent member A with a bottom gasket connection 54.

The lower tubular extension 55 forms a valve housing and it has a central passage 56 in which the spring 57 is positioned.

The openings 55a in the side of the tubular extension 55 permit liquid to pass from within the diaphragm F to the column A above the valve J.

The spring 57 will normally draw down on the plate 58 attached to the valve stem 59 which will draw down the valve element 60 upon its seat and close off the liquid column H. The stem 59 has an end pusher member 61. The diaphragm bag F is held upon the angle sleeve 62 which is threaded on to the nipple 63 at the lower end of the member 52. The intervening gasket 54 will assure a liquid-tight connection.

The end member 61 is adjustable on the stem 59 so as to increase or decrease the spring tension on the valve 60.

The enclosure member G has a threaded connection at 70 to the sleeve member 52 and it has an in-turned bottom portion 71.

The side walls 72 are provided with the openings 73 and 74 which will permit ready application of sea pressure to the bag F. Held in the bottom of the enclosure G will be the flange 75 of the T cross section member 76.

As shown in FIG. 5, there are passageways at 77 and 78 to permit liquid to flow into and out of the lower end of the enclosure G and also to guide the reciprocating movement indicated by the double arrow 79.

The member 76 carries the lower weight K by the screw 80, which fits in a recess 81 in the annular member 82.

The recess 81 at its lower end carries the material 83 which is of the nature of soap, tallow or other material which will adhere and bring up a sample of the bottom.

Referring particularly to the operation of FIGS. 1 to 5, when the instrument strikes the sea bottom, the weighted member K will hit the bottom, contacting the bottom of the bag 84 and lifting the valve pusher member 61 so as to unseat the valve 60 and permit the liquid under pressure to flow into the column A.

As soon as the instrument is elevated the weighted member K will drop and the spring 57 will seat the valve 60, locking the elevated column H in the tube A. This will give a ready reading which can be related to the water depth or pressure in FIG. 6 by the chart as shown, which actually is inscribed on the outside of the tubular enclosure B.

In the alternative arrangement of FIG. 7, the tube A is replaced by the indicator 100, which has a moving pointer 101 passing over circular graduations indicating pounds at 102, fathoms at 103 and feet at 104. The weight member K, the enclosure G, the sleeve 52 may all be of the same construction and a short threaded sleeve 105 may serve as a connection to the gauge 100.

To briefly describe the construction, calibration and use of the variable scale and selector as shown in the present application, the scale is indicated upon the housing in FIGS. 1 and 3 and developed on a flat surface at M in FIG. 6 between the diagrammatic liquid columns at N and P and permits corrections to be made for the barometric pressure of the atmosphere, for variations in temperature of the air or liquid within the device, for variations in the temperature of the liquid being sounded, and for variations in the volume occupied by the air and liquid within the device as compared to the original volume, resulting from expansion and contraction.

Figure 2:
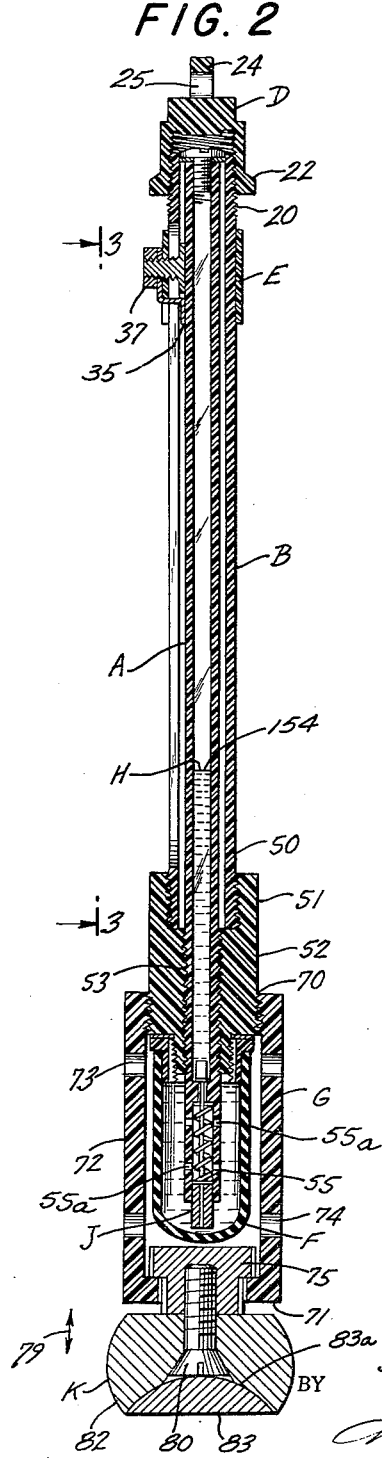
FIG. 2 is a transverse sectional view of the device of FIG. 1.

The liquid H within the liquid tube as indicated in FIGS. 2, 3 and 6 is normally positioned within said tube at atmospheric pressure.

In the alternative form of the device, as shown in FIG. 8, the atmospheric pressure may be restored by unscrewing the cap 199 having the interior gasket 200 which will open the inside of the tube A to atmospheric pressure by the transverse radial opening or openings 190.

The sleeve 197 having the interior thread 195 threaded onto the upper end of the tube A and the exterior thread 196 threaded into the skirt 198 will carry the device 199 on top of the column A.

However, in either form as shown in FIGS. 1 to 6 or in FIG. 8 the air or gas above the liquid column H will be subjected to a higher temperature in the atmosphere normally than when dropped into the liquid body and the temperature of the air will normally be much higher than the temperature of the water wherever the sounding is taken.

From the difference in the level of the liquid the zero reading on the calibrated variable scale, as shown in FIGS. 1, 3 and 6 may be established and the computation and conversion of the same to give the reading of depth may be made by calculating the pressure of seawater at a density of 1.025 at various depths.

For example, when the device is cast into a liquid to be sounded and lowered to the bottom of the liquid and then brought up and trapped, by pressing the weight upwardly, the liquid will fall to a low point in the tube A.

Then the lower edge of the scale selector E will cross the zero line on the calibrated variable scale at the point 153 which shows the person taking the sounding that the scale position indicated at 5 is to be used in reading the soundings in that locality.

Then the device is again cast, lowered to the bottom, brought up and assuming for the purpose of illustration the liquid in the tube is found at 20, the position indicated at 20 on the left of the chart of FIG. 6, then the reading is made at position 5 on the oblique line or graduation 157 which will then be referred to the vertical graduations 150 to give a correct depth. Thereafter, wherever the liquid level may be, the reading may be directly taken at position 5 on the oblique graduation lines of FIG. 6 to give the correct depth without further calculation.

The calibrated scale of FIG. 6 may be of any size or any number of graduations suitable for the size and design of the device.

It is thus apparent that the applicant has provided a simple, readily operated depth and pressure gauge in which the difficulties of throwing out a weight are eliminated and in which the depth determination will be independent of the currents, condition of the bottom, movement of the boat, or variation between operators.

The depth and pressure gauge device of the present invention has many advantages such as the following:

(a) It may be used both for taking soundings to determine the depth and pressure as well as to take a sample from the bottom for analysis purposes.

(b) It may be used by divers to record the depth of the dive or the depth and pressure at any stage of the dive.

(c) It may be used with water filled tanks, cisterns, pools, or natural or artificial lakes to determine the depth of the water therein, as well as the internal pressure.

(d) It may be used to determine the capacity of various types of storage tanks, water pressure tanks on the tops of buildings, petroleum or other tanks upon sea-going vessels, liquid storage tanks on land, and railroad tank cars to determine both capacities and depths of liquid therein.

(e) It may be used in connection with water wells to determine the depth and water pressure therein.

(f) It may be used by wharfingers to sound alongside or at a distance off berths, docks and wharves to determine what types of vessels may be moored thereat without necessarily using a boat to sound off-shore or at a distance away from the berth as is necessary with present-day sounding methods.

(g) It may be used by marine personnel, pilots, navigators and surveyors to determine the depth of water and/or the pressure of waters to be navigated and sounded.

(h) It may be used in navigating a vessel and determining her position by sounding of depth and obtaining a sample of bottom.

(i) It may be used by fishermen, dock builders, salvage companies, and yachtsmen to determine depth, type of bottom and/or pressure at that depth.

Among the important advantages of the present device is the fact that:

(1) It is inexpensive to construct and maintain.
(2) It is easily constructed of a few moving parts.
(3) It is superior in its accuracy to present day sounding methods.
(4) It is corrosion resistant.
(5) It is rugged and able to withstand normally rough rough usage.
(6) It is self contained and portable.
(7) It requires no expense of installation.
(8) It requires no experience to use or operate.
(9) It is easily adjustable by a layman.
(10) Its soundings may be taken while vessel is in motion at a moderate speed.
(11) It is not affected by tidal currents.
(12) It is not dependent on length of line for accurate reading of depth, therefore is not affected by rough waters or foul weather conditions.
(13) It is not affected in its reading by the type of bottom sounded as sometimes occurs with electronic sounding devices.
(14) It does not require resetting after each reading to obtain next reading.
(15) It is self operating, trips itself before and after each reading.
(16) It provides a direct reading from variable scale—in feet, or fathom, or pressure in pounds—depending on type of graduations on scale, which may be in feet, fathom and pressure in pounds.
(17) It is self adapting, requires no adjustments or changes when used in sounding deep or shallow waters.
(18) The device brings up a sample of bottom when armed to assist navigator in determining vessel's position.
(19) It is weighted with suitable interchangeable weight to reach bottom fast.
(20) The device is exceptionally useful, and accurate in shallow waters where correct soundings are necessary due to the method of calibration and self-tripping characteristic when device strikes bottom.
(21) The device may be cast to side, ahead or astern of vessel in order to obtain sounding of depth and/or reading of pressure in area or vicinity of vessel or observer thus not requiring vessel or observer to be directly over area sounded, thus permitting soundings to be obtained prior to entering area sounded, in this way informing observer of hazardous depth without endangering vessel as is necessary with present day sounding methods.
(22) The device offers convenience due to its being easily adapted to a varied number of purposes by using appropriately calibrated scale.
(23) The device will not clog or be affected in its reading due to foreign matter in liquid in which submerged.
(24) The device may be adapted and constructed from pocket size to a suitable size for ocean going vessels.
(25) The colored non-freezing, non-vaporizing liquid within the tube permits easier reading of the scale.
(26) A high degree of accuracy and finer calibration is easily accomplished by use of a larger liquid tube and by making calibrated variable scale larger in size thus permitting finer graduations to be made on scale.
(27) The device is equipped with a calibrated variable scale which shows and permits correction for effects of barometric pressure of atmosphere, effects of temperature on air and/or liquid within device, effect of temperature by liquid being sounded, effect on the ratio of volume occupied by air which contracted or expanded within the liquid tube and the original volume within said tube before being affected by changes in temperature between air and liquid sounded, surface pressure of air, change in temperature of device which takes on temperature of the liquid at bottom, at the location to be sounded, thus permitting selection of calibrated variable scale by use of the scale selector.
(28) The device may be easily equipped with a calibrated variable scale for density and pressure, exact, for the weight of liquid being sounded or else a short and simple mathematical calculation may be made for specific gravity of liquid sounded and the ratio of its density to that of the liquid for which scale was calibrated.

To give a specific example of the manner in which the device may be utilized, it may be assumed that the scale is calibrated for a density of seawater 1.025.

If reading of depth on scale be twenty-five (25′) in fresh water

```
    25.00  Reading on scale
   ×.025   Percent of difference
   ─────
   12500
    5000
   ─────
  0.62500′ Correction = 0.6′ foot
   25.00
   ─────
   25.6′ = Actual depth of water
```

If density of liquid sounded is less that that for which scale is calibrated percentage of difference is added to reading. If density of liquid sounded is greater than that for which scale is calibrated, then percentage of difference should be subtracted from reading.

Generally one foot (1′) is added to the reading for every fifty feet (50′) of fresh water sounded.

As many changes could be made in the above depth gauge, and many widely different embodiments of this invention could be made without departure from the scope of the claims, it is intended that all matter contained in the above description shall be interpreted as illustrative and not in a limiting sense.

The obliquely graduated scale is used where it is not possible to adjust the air or gas pressure above the liquid level in the indicator to atmospheric temperature conditions encountered in different bodies of water or other liquids.

In this case the oblique graduations of the scale will accommodate and correct for the departure of the top of the liquid level in the graduated transparent column from or above the zero graduation when the temperature of the water is less than atmosphere.

In such case the scale selector is moved down until the lower edge of the collar is at the liquid level and vertical graduations from 1 to 10 will give the correct scale to use.

For example if graduation 5 is at the oblique zero line, thereafter the scale corresponding to graduation will also be by the vertical graduation 5.

The liquid to be used as the indicating liquid may be a non-evaporating, non-freezing liquid such as ethylene glycol.

The material 83 filling the recess 83a may have adhesive qualities so that it may pick up a sample or small quantity of the bottom material to permit analysis thereof.

In this way it is possible to determine whether the bottom is mud, clay or sand which in conjunction with the navigation charts will also enable determination of the position of ship or boat.

The material 83 may consist of tallow, soap, putty or other adhesive materials.

In operation, the device is just cast or dropped to the bottom in a body of water. The tube A will contain in its lower portion a body of colored liquid H such as cyclohexane or ethylene glycol or other liquid mixtures which will not freeze or vaporize changing the vapor pressure above liquid surface H.

In its upper portion it will contain a body of air or inert gas at atmospheric pressure.

After casting and removal from the body of water, the liquid column H upon release of the valve 60 will not return to zero position indicated at 150 in FIGS. 1, 3 and 6, but will be higher or lower depending upon the temperature of the body of water in which it has been submerged.

In order to cancel out and avoid the effect of varying water temperature and varying barometric pressure at water level, a correction scale may be employed.

Thereafter all readings are corrected to the scale 5 when they are made in the same locality without substantial change in atmospheric pressure or water temperature.

When the temperature or location is changed, a different scale will have to be determined.

In the same position and under the same conditions for each case, the lower edge of the sleeve E is set down to the meniscus of the liquid column H and the depth is determined by reading the position of scale 5.

For example in an upper position of the selector E in FIG. 6, the lower edge 31 will be followed to position 5 at 156 and then down the oblique line 157 to graduation 20 at 158 indicating a depth of 20 feet.

To determine the scale on which the depth readings are to be taken, the lower edge 32 of the scale selector E is followed around until its edge 32 intersects the oblique zero line 152 in the scale (see FIGS. 1 and 6).

At this point the reading on the sleeve 29 of the selector E will give the scale. For example in FIG. 6 the scale 5 will be indicated at 153 corresponding to a column level at 154.

In other words the column level at zero instead of being at position 155 will be at position 154 because of variation in water temperature or barometric pressure.

The scale graduations as indicated in FIGS. 1 and 6 enable correction for the water temperature and barometric pressure at the point where the readings are to be taken. The liquid containing tube A indicated in FIG. 2 will have the liquid of level therein subject to variation because of varying water temperature and varying barometric pressure and to accomplish this the device of FIGS. 1 to 5 may be dropped to the bottom then brought up and tripped by pressing the weight mass K upwardly.

It may be assumed, referring to FIG. 6, that the liquid in the tube will fall to a definite level which is indicated at 154 in connection with the diagram of the tube indicated at P at the right of FIG. 6. This increased level 154 as compared to the zero level 155 in the diagram of the tube M at the left of FIG. 6 will give the total effect of the varying temperature and varying barometric pressure.

The scale selector E may then be moved downwardly so that its lower edge 32 will be at the upper edge 154 of the liquid column in the tube P and where the lower edge 32 crosses the zero line 152, namely at the point 153 and this will constitute the point from which the measured depth may be calculated.

In other words, the scale selector will indicate that the position 5 is the proper vertical scale to utilize in measuring the depth which is indicated by the instrument.

In other words, the scale to be used is that which corresponds to position 5 on the scale selector E and this will automatically compensate for the various temperatures and pressures.

For example after the determination that the scale 5 should be used, the device is again cast and lowered to the bottom and brought up and the liquid level is found to be at the lower edge 31 in the upper position of the selector E in FIG. 6 then the reading will be made at 156 at position 5 indicating a depth of twenty feet. Once the scale 5 is selected, no further compensation need be calculated in the general locality where the device is used.

The tube N shows the level 155 as if there was no compensation necessary whereas the tube P shows the compensation necessary which can be determined before soundings are taken. Each time a sounding is taken the lower edge of the selector E will be placed at the top of the liquid level and the desired scale will be read thereon where it crosses the particular oblique graduation indicated in FIG. 6.

In connection with the device of FIG. 7, to compensate, the device is first cast to the bottom of the liquid sounded then hauled up and the changes due to the effects of the pressure and temperature are noted when the device is tripped. This will be indicated by whether the needle or pointer 101 is above or below the zero reading on the dial scale. For example, the indication may give three feet above or below the zero reading which may thereafter be subtracted or added to the reading on the dial.

The tension of the spring 57 may be varied by tightening or loosening the plug or guide element 61. When the tension is increased the reciprocating weight K is necessary to release the valve 60 at the bottom with the spring 57 giving positive closure as the gauge is pulled up off the bottom.

When the tension of the spring 57 is decreased, the pressure of the water will open the valve 60 even before the bottom is reached forcing the liquid H up in the tube A.

As soon as the gauge is lifted decreasing the water pressure, the valve 60 will close under the pressure of the compressed air in the top of the column A.

If desired the valve could be removed in which case the liquid level in the tube would indicate the actual depth to a diver who could take the device with him.

It is also possible to use a circular flexible or rigid liquid containing tube in which case the device might be shaped circularly instead of longitudinally and actually used as bracelet by a diver.

Having now particularly described and ascertained the nature of the invention, and in what manner the same is to be performed, what is claimed is:

1. A depth and pressure gauge of the type having elongated graduated vertical cylindrical tubular sleeve communicating at its lower end with a bag-like diaphragm, said gauge of the type for measuring the depth and pressure at the bottom of a body of water and of the type having a vertical column receiving a body of an indicating liquid with a bottom container in communication with the column also receiving the indicating liquid, comprising a gauging means, means to actuate said gauge when it descends to the bottom and spring pressed plunger means to lock said actuation at the bottom, said gauge having an enlarged diameter lower cylindrical sleeve with side walls having open passageways therein, the lower end of said sleeve carrying said actuating means including a reciprocatory weight and the upper end of said sleeve carrying the gauging means including an elongated graduated column having a suspension means at the top thereof and said sleeve itself carrying a reciprocatory spring pressed plunger and means to enclose said plunger including said diaphragm, said spring pressed plunger including a valve to open and close the lower end of said column.

2. A depth and pressure gauge of the type having elongated graduated vertical cylindrical tubular sleeve communicating at its lower end with a bag-like diaphragm, said gauge of the type for measuring the depth and pressure at the bottom of a body of water and of the type having a vertical column receiving a body of an indicating liquid with a bottom container in communication with the column also receiving the indicating liquid, comprising a gauging means, means to actuate said gauge when it descends to the bottom and spring pressed plunger means to lock said actuation at the bottom, said gauging means including a liquid column, said gauge having an enlarged diameter lower cylindrical sleeve with side walls having open passageways therein, the lower end of said sleeve carrying said actuating means including a reciprocatory weight and the upper end of said sleeve carrying the gauging means including an elongated graduated column having a suspension means at the top thereof and said sleeve itself carrying a reciprocatory spring pressed plunger and means to enclose said plunger including said diaphragm, said spring pressed plunger including a valve to open and close the lower end of said column.

3. A water depth and pressure gauge of the type having elongated graduated vertical cylindrical tubular sleeve communicating at its lower end with a bag-like diaphragm, said gauge of the type for measuring the depth and pressure at the bottom of a body of water and of the type having a vertical column receiving a body of an indicating liquid with a bottom container in communication with the column also receiving the indicating liquid, comprising a gauging means, reciprocable weight means to actuate said gauge when it descends to the bottom and spring pressed plunger means to lock said actuation at the bottom, said gauging means including a bag-like diaphragm, said gauge having an enlarged diameter lower cylindrical sleeve with side walls having open passageways therein, the lower end of said sleeve carrying said actuating means including a reciprocatory weight and the upper end of said sleeve carrying the gauging means including an elongated graduated column having a suspension means at the top thereof and said sleeve itself carrying a reciprocatory spring pressed plunger and means to enclose said plunger including said diaphragm, said spring pressed plunger including a valve to open and close the lower end of said column.

4. A depth and pressure gauge of the type having elongated graduated vertical cylindrical tubular sleeve communicating at its lower end with a bag-like diaphragm, said gauge of the type for measuring the depth and pressure at the bottom of a body of water and of the type having a vertical column receiving a body of an indicating liquid with a bottom container in communication with the column also receiving the indicating liquid, comprising a gauging means, means to actuate said gauge when it descends to the bottom and spring pressed plunger means to lock said actuation at the bottom, said locking means including a valve to permit passage of bottom pressure and to prevent release of said pressure, said gauge having an enlarged diameter lower cylindrical sleeve with side walls having open passageways therein, the lower end of said sleeve carrying said actuating means including a reciprocatory weight and the upper end of said sleeve carrying the gauging means including an elongated graduated column having a suspension means at the top thereof and said sleeve itself carrying a reciprocatory spring pressed plunger and means to enclose said plunger including said diaphragm, said spring pressed plunger including a valve to open and close the lower end of said column.

5. A depth and pressure gauge of the type having elongated graduated vertical cylindrical tubular sleeve communicating at its lower end with a bag-like diaphragm, said gauge of the type for measuring the depth and pressure at the bottom of a body of water and of the type having a vertical column receiving a body of an indicating liquid with a bottom container in communiaction with the column also receiving the indicating liquid, comprising a gauging means, means to actuate said gauge when it descends to the bottom and spring pressed plunger means to lock said actuation at the bottom, said means to actuate consisting of a weight to assure operation of said gauging means, which weight is elevated by the bottom, said gauge having an enlarged diameter lower cylindrical sleeve with side walls having open passageways therein, the lower end of said sleeve carrying said actuating means including a reciprocatory weight and the upper end of said sleeve carrying the gauging means including an elongated graduated column having a suspension means at the top thereof and said sleeve itself carrying a reciprocatory spring pressed plunger and means to enclose said plunger including said diaphragm, said spring pressed plunger including a valve to open and close the lower end of said column.

6. A depth and pressure gauge of the type having elongated graduated vertical cylindrical tubular sleeve communicating at its lower end with a bag-like diaphragm, said gauge of the type for measuring the depth and pressure at the bottom of a body of water and of the type having a vertical column receiving a body of an indicating liquid with a bottom container in communication with the column also receiving the indicating liquid, comprising a gauging means, reciprocable weight means to actuate said gauge when it descends to the bottom and spring pressed plunger means to lock said actuation at the bottom, said gauging means consisting of a liquid column having a bag-like diaphragm on the lower part thereof and a valve included in said bag-like diaphragm, said means to actuate the valve consisting of a weight which, when striking the bottom, will unseat said valve to permit communication of bottom pressure to said gauging means, said gauge having an enlarged diameter lower cylindrical sleeve with side walls having open passageways therein, the lower end of said sleeve carrying said actuating means including a reciprocatory weight and the upper end of said sleeve carrying the gauging means including an elongated graduated column having a suspension means at the top thereof and said sleeve itself carrying a reciprocatory spring pressed plunger and means to enclose said plunger including said diaphragm, said spring pressed plunger including a valve to open and close the lower end of said column.

7. A depth and pressure gauge comprising a lower cylindrical sleeve housing having openings in the side walls thereof to permit free passage of water into and out of said sleeve, a reciprocable weight carried at the lower end of said sleeve, a valve housing with a reciprocable spring biased valve in said housing, a concentric vertical inner gauge tube and outer protector tube mounted on and extending upwardly from said valve housing, said protector tube being vertically slotted to permit reading of the gauge tube and carrying a series of oblique closely spaced depth graduations to indicate depth and compensate for varying temperature and barometric pressure, a top closure for said concentric tube having suspension means, a sliding scale selector sleeve graduated on its lower edge and encircling said protector tube, to enable selection of a scale to compensate for said temperature and pressure variation and a bag-like diaphragm carrying an indicating liquid in said sleeve housing communicating through the valve housing with the lower end of the inner gauge tube and a downwardly projecting plunger in said diaphragm to be operated by the reciprocable weight through the bottom of the bag diaphragm and in turn to operate the valve, said valve when moved upwardly establishing communication between the bag and the inner tube and when moved down cutting off said communication.

8. The gauge of claim 7, said weight having an upwardly extending member extending into the bottom of the sleeve and said sleeve and said member having inwardly projecting circular flanges to prevent separation of the weight and the sleeve.

9. The gauge of claim 7, said valve housing having an elongated tubular guide member extending downwardly from the lower end of the inner tube and having a central sliding rod carrying a valve at the lower end of the inner gauge tube at its upper end and the plunger at its lower end.

10. The gauge of claim 7, said top closure having means to permit atmospheric pressure to be established in the upper portion of the inner tube.

11. The gauge of claim 7, said selector sleeve having a screw member to permit it to be locked in any position along the vertical length of said concentric tube.

12. The gauge of claim 7, the lower end of said weight being recessed and being provided with means to take up a specimen of the sea bottom.

13. A depth and pressure gauge of the type for measuring the depth and pressure at the bottom of a body of water and of the type having a vertical column receiving a body of an indicating liquid with a bottom container in communication with the column also receiving the indicating liquid, said gauge comprising a lower wide diameter short vertical cylindrical element and an elongated narrow diameter graduated transparent cylindrical member, a bag-like diaphragm enclosing the lower end of the transparent cylindrical member and a downwardly spring pressed reciprocating valve member in said bag-like diaphragm to close off or open communication between the lower end of the cylindrical member and the interior of the bag-like diaphragm, said bag-like diaphragm when pressed upwardly from its bottom opening said valve and a presser member actuated by pressure upwardly to move upwardly against and press said diaphragm upwardly to open said valve.

14. The gauge of claim 13, said presser member having a weight actuated upon contact with a bottom of a body of water.

References Cited in the file of this patent

UNITED STATES PATENTS

| | | |
|---|---|---|
| 242,278 | Davidson | May 31, 1881 |

FOREIGN PATENTS

| | | |
|---|---|---|
| 113,232 | Germany | Sept. 10, 1900 |
| 103,401 | Great Britain | Jan. 25, 1917 |
| 333,793 | Great Britain | Aug. 21, 1930 |
| 619,092 | Germany | Sept. 21, 1935 |